Figure 1:
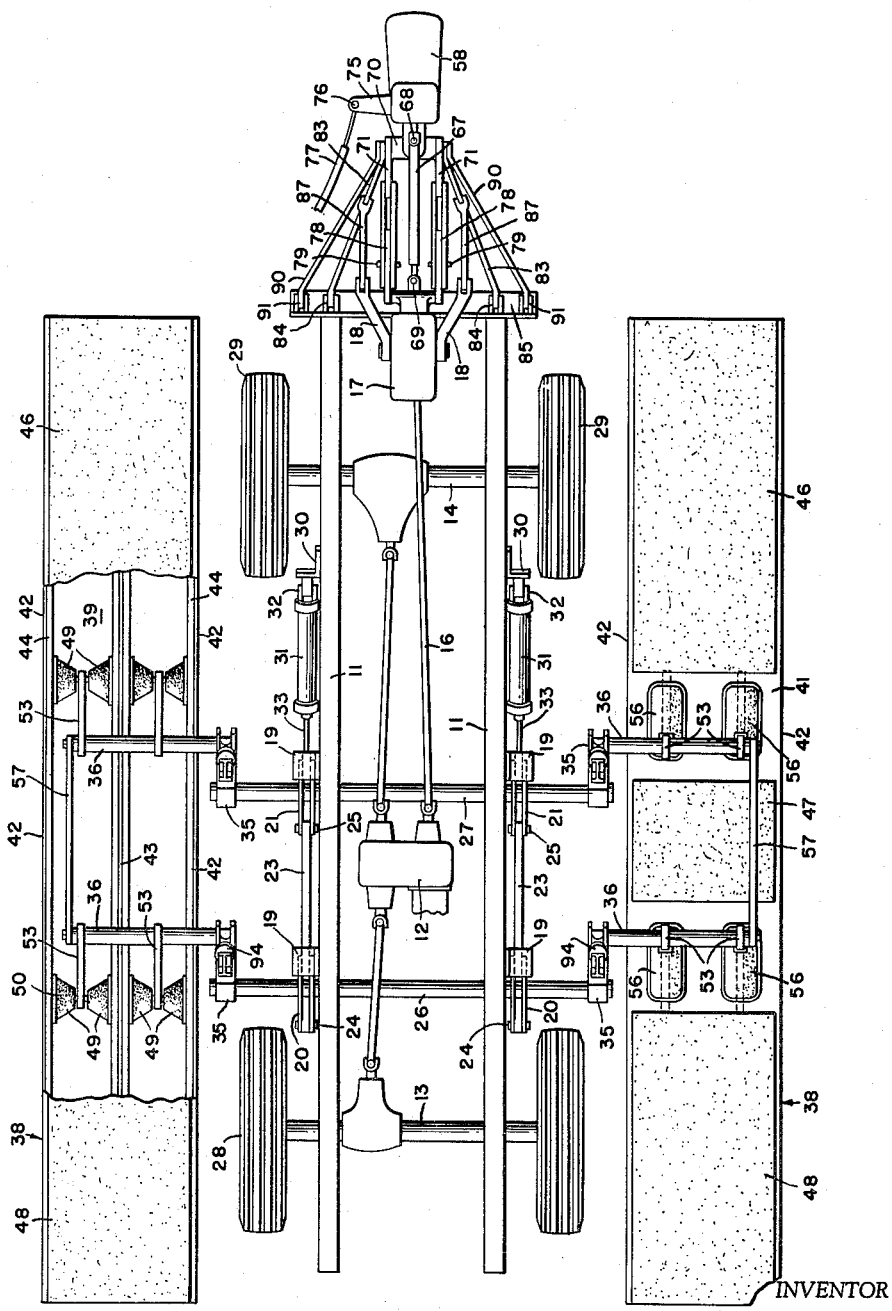

March 27, 1962  D. R. PENDER  3,026,841
AMPHIBIAN VEHICLE
Filed Nov. 2, 1960  4 Sheets-Sheet 1

INVENTOR
DAVID R. PENDER

BY  *B. P. Fishburne, Jr.*
ATTORNEY

March 27, 1962 — D. R. PENDER — 3,026,841
AMPHIBIAN VEHICLE
Filed Nov. 2, 1960 — 4 Sheets-Sheet 2

INVENTOR
DAVID R. PENDER
BY
ATTORNEY

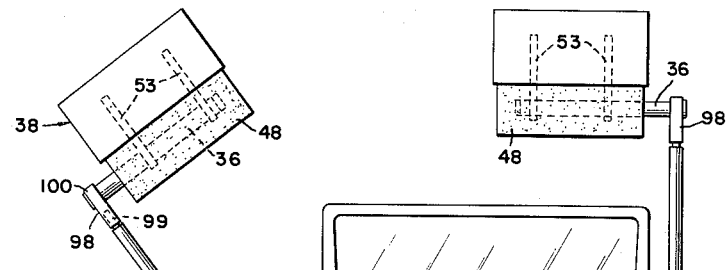
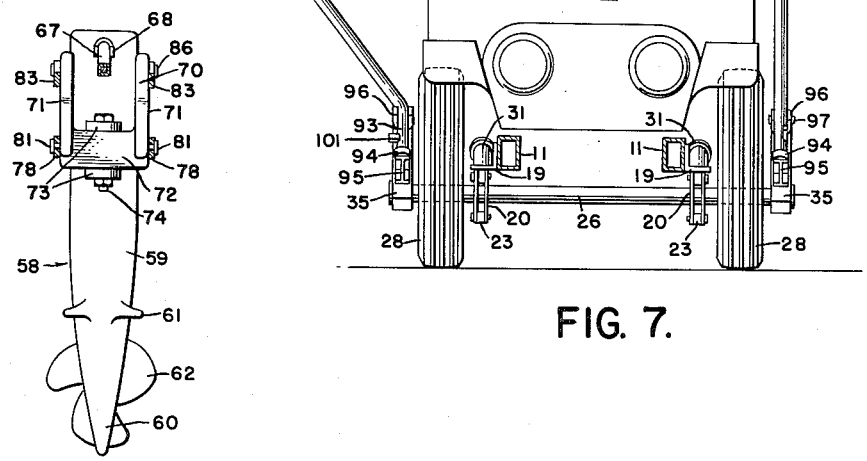
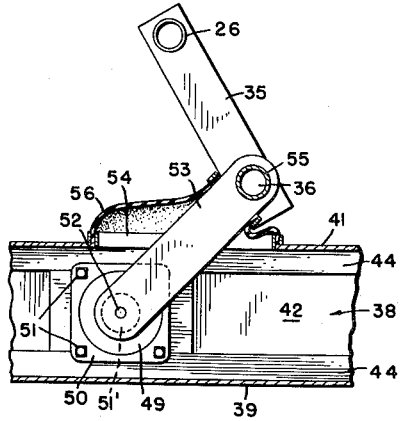
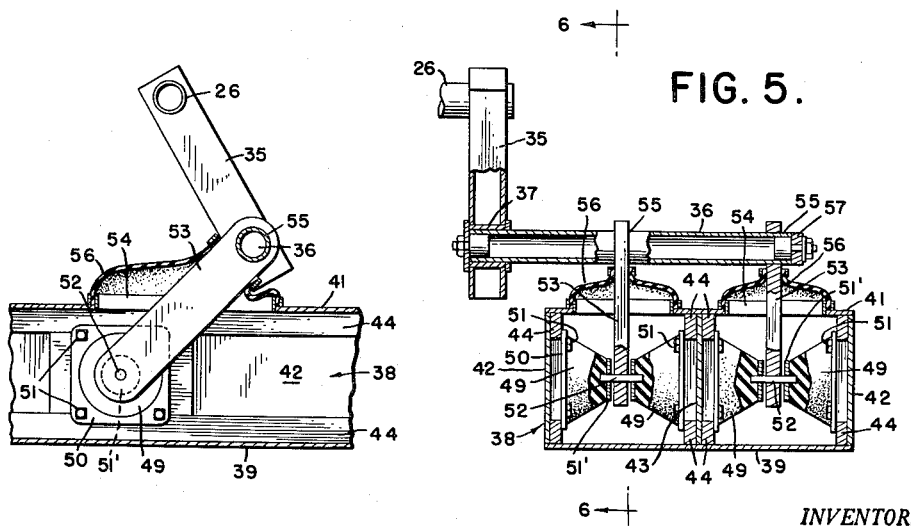

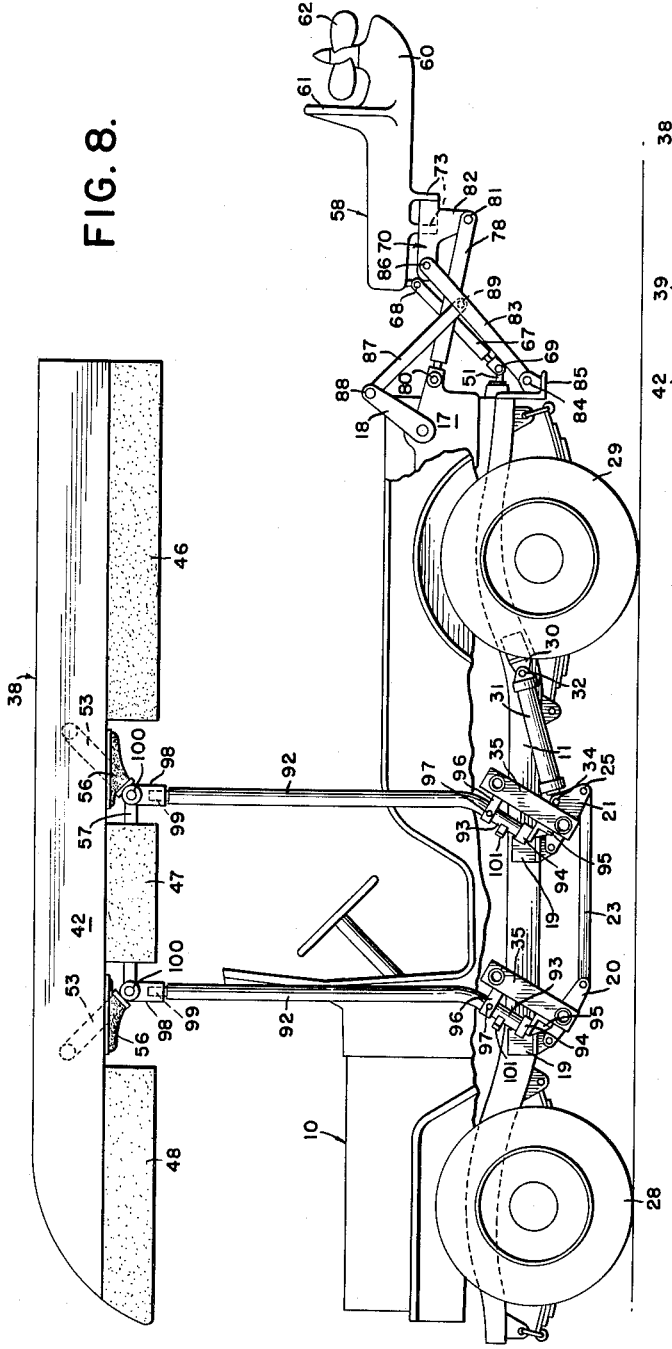

United States Patent Office 3,026,841
Patented Mar. 27, 1962

3,026,841
AMPHIBIAN VEHICLE
David R. Pender, 1018 Marion St., Columbia, S.C.
Filed Nov. 2, 1960, Ser. No. 66,734
8 Claims. (Cl. 115—1)

This invention relates broadly to amphibian vehicles, and more particularly to means for converting conventional land vehicles into vehicles capable of amphibian operation.

An object of the invention is to provide means in the nature of an attachment for conventional four wheel drive land vehicles, and the like, to convert the same into amphibian vehicles with little or no alteration of the structure of the land vehicle and with minimum labor and expense.

Another object of the invention resides in the provision of an amphibian vehicle of the above-mentioned character for civilian use by sportsmen and the like, and also ideally suited to military application by converting the well-known "jeep" type vehicles into amphibian craft, quickly and by the use of unskilled mechanics.

A further object of the invention is to provide an amphibian vehicle having twin outrigger hulls or pontoons capable of providing a planing surface below the wheels and associated structures of the land vehicle, whereby the amphibian vehicle will be capable of high speed operation without drag in the water.

Another important object of the invention is to provide a novel "outdrive" propulsion means for an amphibian vehicle driven by the conventional power take off shaft of the land vehicle, in conjunction with the standard change speed transmission, whereby the amphibian vehicle may be operated with the characteristics of a speedboat (high gear and small propeller) or a tugboat (low gear and large propeller).

A further object is to provide in an amphibian vehicle of the mentioned character novel means for raising and lowering the pontoons in relation to the land vehicle, and for simultaneously shifting the center of gravity backward or forward longitudinally to compensate for variations of loading on the amphibian vehicle.

A further object of the invention is to provide a novel resilient suspension system for the pontoons of the vehicle to allow flexibility between the pontoons and the rigid pontoon carrying and vehicle structure.

Another important object is to provide novel and simplified means for transporting the detachable pontoons overhead or above the land vehicle when the latter is traveling over land, such means coacting in a novel manner with the pontoon raising and lowering means to shift the pontoons to and from their active and stored positions.

Still another object is to provide a mount for the outdrive unit, connected with conventional lift means of the land vehicle, in a manner permitting steering of the amphibian vehicle from the driver's seat of the land vehicle, and also allowing the outdrive unit to be positioned at various elevations and angles in the water or lifted entirely above the water to an inactive position, as when the land vehicle is traveling over land.

Other objects and advantages of the invention will become apparent during the course of the following detailed description.

Figure 2:
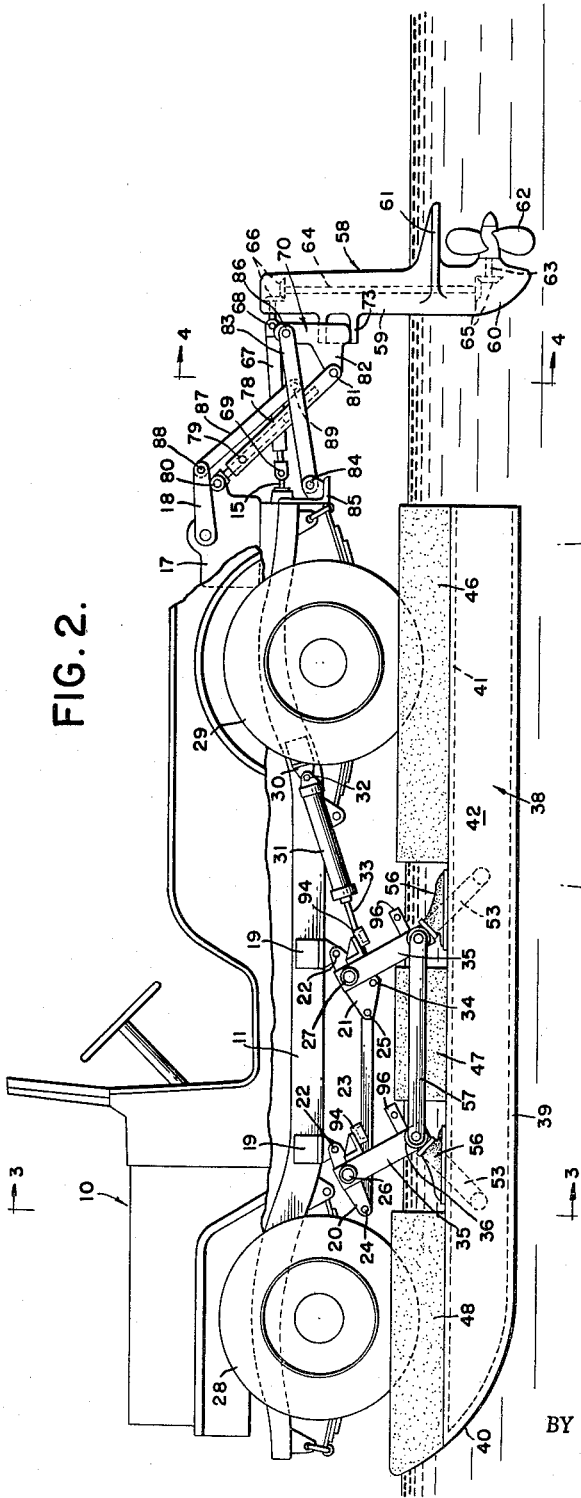
Figure 3:
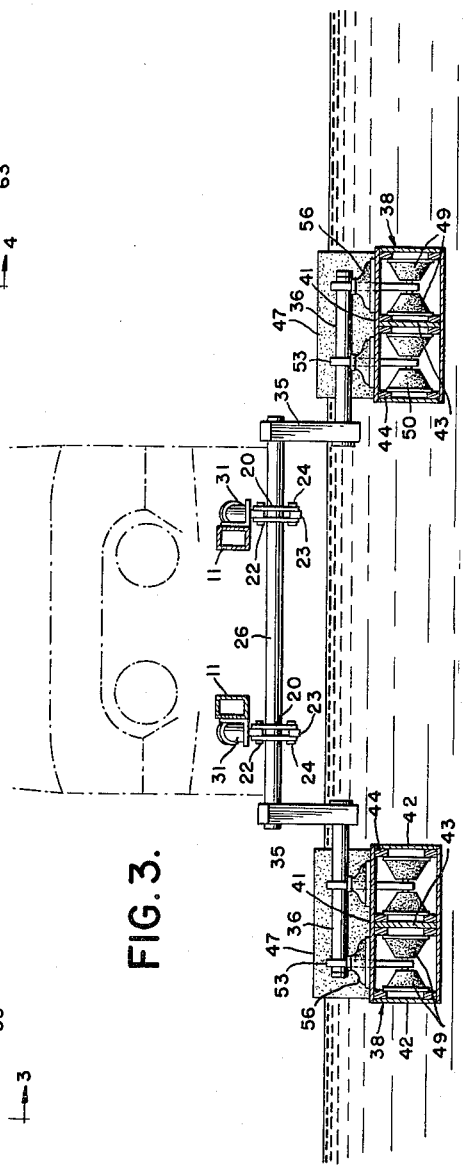

In the accompanying drawings forming a part of this application and in which like numerals are employed to designate like parts throughout the same, FIGURE 1 is a top plan view of an amphibian vehicle according to the invention with parts omitted and parts broken away to more clearly illustrate the operating components of the invention, FIGURE 2 is a side elevation of the amphibian vehicle shown in FIGURE 1, FIGURE 3 is a transverse vertical section taken substantially on line 3—3 of FIGURE 2 with parts omitted, FIGURE 4 is a vertical section taken on line 4—4 of FIGURE 2, FIGURE 5 is an enlarged fragmentary transverse vertical section showing detail constructions of the pontoon suspension system, FIGURE 6 is a fragmentary vertical section taken on line 6—6 of FIGURE 5, FIGURE 7 is a front elevation of the land vehicle showing the means for carrying the pontoons overhead during land travel, FIGURE 8 is a side elevation of the amphibious vehicle showing the pontoons being carried overhead and the outdrive unit in the raised or inactive position, FIGURE 9 is a fragmentary plan view illustrating the manner of lowering the pontoons from their overhead positions and prior to attaching the pontoons in their upright positions to the vehicle.

In the drawings, wherein for the purpose of illustration is shown a preferred embodiment of the invention, the numeral 10 designates generally a land vehicle, preferably of the four wheel drive type, such as the well-known civilian or military "jeep" vehicle. This land vehicle 10 has a main frame including frame sides 11, to which main components of the amphibian attachment are secured in a manner to be described. The vehicle 10 has a change speed transmission 12 for transmitting power to the forward and rear axles 13 and 14 in the conventional manner shown diagrammatically in FIGURE 1. The vehicle 10 is also provided at its rear end with the usual power take off shaft 15, operated by a drive shaft 16, connected with the transmission 12. The usual hydraulic lift unit 17 is provided at the rear end of the vehicle 10, including vertically swingable crank arms 18 which are employed in a manner to be described for raising and lowering the outdrive or propulsion unit of the amphibian vehicle.

While the land vehicle 10 shown in the drawings is of the four wheel drive or "jeep" type for purposes of illustration, it should be understood that the invention is not limited to this one type of land vehicle and the amphibian attachment according to the invention with suitable modification may be applied to various types of land vehicles as may be found desirable.

With continued reference to the drawings, outrigger brackets 19 are secured rigidly to the frame sides 11 of land vehicle 10 in spaced relation intermediate the front and rear wheels of the land vehicle, as shown in FIGURES 1 and 2. Main crank arms 20 and 21 are pivotally secured to the brackets 19 at 22 for vertical swinging movement, just outwardly of the frame sides 11 at opposite sides of the vehicle main frame. Longitudinally shiftable horizontal connecting rods 23 interconnect the main cranks 20 and 21 and have their ends pivoted thereto at 24 and 25. Main horizontal transverse pontoon support shafts 26 and 27 underlie the frame sides 11 and are rigidly secured to and carried by the main crank arms 20 and 21. The ends of the shafts 26 and 27 preferably extend somewhat outwardly of the forward and rear wheels 28 and 29 of the land vehicle 10 as shown in FIGURE 1.

Additional outrigger brackets 30 are rigidly secured to the frame sides 11 near the rear wheels 29, FIGURE 2, and hydraulic cylinders 31 have their rear ends pivotally secured at 32 to the brackets 30, as shown. Extensible and retractable piston rods 33 projecting forwardly from the cylinders 31 have their forward ends pivotally secured at 34 to the rearmost pair of main cranks arms 21 for actuating the latter. The hydraulic cylinders or rams 31 may be readily controlled from the driver's seat of the vehicle 10 by suitable conventional control means omitted from the drawings for the purpose of simplification. As should be obvious, pressurizing of the two cylinders 31 causes extension of the piston rods 33 and clockwise movement of the crank arms 20 and 21 in unison about their pivots 22. Retraction of the piston rods 33 causes reverse or counter-clockwise movement of the crank arms 20 and 21 toward their positions illustrated in FIGURE 8.

End crank arms 35 are rigidly secured to the outer ends of the main support shafts 26 and 27, as shown, and the crank arms 35 are bodily shiftable with the support shafts 26 and 27 and the control linkages including piston rods 33 and main crank arms 20 and 21.

With continued reference to the drawings, horizontal laterally outwardly extending pontoon support shafts 36, or crank pins, are carried by the lower ends of the crank arms 35, and journaled for rotation relative to the crank arms 35, as best shown at 37 in FIGURE 5. The pontoon support shafts 36 are thus mounted for movement in unison upwardly and downwardly and fore and aft with the end crank arms 35, as should be obvious.

Hollow elongated pontoons shown generally at 38 are carried by the pairs of shafts 36 upon opposite sides of the vehicle, the pontoons underlying the support shafts 36, as shown. The pontoons 38 are rectangular in cross section and include flat bottom walls 39 providing planing surfaces for the vehicle in the water. The forward extremities of the pontoons 38 are upwardly curved at 40 to provide for easy passage through the water. The pontoons further comprise top walls 41, vertical side walls 42 and intermediate longitudinal webs or partitions 43, rigidly interconnecting the top and bottom walls of the pontoons. The relatively thin walled box-like pontoons 38 are preferably reinforced at their corners and on opposite sides of the intermediate partition 43 with suitable longitudinal stringers 44, suitably rigidly secured thereto. The pontoons are of course water tight and possess high flotation characteristics. The pontoons are relatively shallow vertically as shown in FIGURES 3 and 5. To add to their buoyancy, as found desirable, sections 46, 47 and 48 of highly buoyant material such as styrofoam or other unicellular expanded plastics material, or the like, are fixedly mounted upon the tops of the pontoons 38, as shown.

Means to suspend the pontoons resiliently from the shafts 36 of the rigid support structures is provided. Such means comprises, as shown in the drawings, preferably rubber conically tapered resilient suspension blocks 49, arranged in opposed pairs beneath the shafts 36 and within the pontoons, between the side and intermediate walls thereof. The outer ends of the suspension blocks 49 are suitably bonded to mounting plates 50, bolted at 51 to the pontoon side and intermediate walls. The outer ends of the rubber suspension blocks 49 may be suitably secured to the vertical walls of the pontoons in any other preferred manner. The inner reduced ends of the suspension blocks 49 have plates 51' suitably anchored thereto in spaced opposed relation, as best shown in FIGURE 5. Screw-threaded studs or pins 52 are rigidly secured to the plates 51' of the rubber suspension blocks 49, and the studs or pins 52 are also secured rigidly to pairs of bars 53, having their lower end portions disposed between the opposed pairs of rubber suspension blocks 49, FIGURE 5.

Adjacent the rigid bars 53, the pontoons 38 are provided in their top walls with preferably longitudinally elongated openings 54, receiving the inclined bars 53 therethrough. The tops of the bars 53 are secured rigidly by welding or the like to the horizontal pontoon support shafts as shown at 55 in the drawings. Flexible water tight boots 56 surround the rigid bars 53 snugly, above the tops of the pontoons, and the bottoms of these boots 56 are connected in a water tight manner around the margins of the top openings 54 in the pontoons.

Horizontal stress equalizing or relieving bars 57 may interconnect the outer ends of adjacent pairs of the pontoon support shafts 36, as shown. These bars 57 are an optional feature of the invention and may be omitted entirely if preferred. The ends of the stress relieving bars 57 are pivoted to the ends of the shafts 36 so that the latter may move with the end crank arms 35 as the latter swing vertically. The purpose of the bars 57 is to relieve or distribute the stress on the individual resilient pontoon mountings such as the one shown in detail in FIGURE 5.

When shock forces from the water are imparted to the pontoon 38, vertically, axially, laterally or in any combination of directions, such shock forces are absorbed resiliently by the rubber suspension blocks 49 and their mountings detailed in FIGURE 5 and described above. Sheer stresses are imparted to the blocks 49, and these blocks absorb the shocks and stresses and prevent shocks on the pontoons from being directly imparted to the rigid mechanism carrying the pontoons and through this mechanism to the land vehicle main frame.

An outdrive or propulsion unit 58 is provided for propelling and steering the amphibian vehicle in the water. The outdrive unit 58 comprises an elongated body portion or housing 59, disposed vertically when the outdrive unit is active, FIGURE 2. The body portion 59 has a rudder extension 60 formed integral therewith at its lower end and a trailing horizontal planing extension 61 may also be provided near and above the propeller 62. The propeller is driven by a short horizontal shaft 63 and a longer vertical shaft 64, operatively connected by gearing 65. Additional gearing 66 in the top of the unit 58 operatively interconnects the shaft 64 with an extensible drive shaft 67, having universal joints 68 and 69, the latter being connected directly to the power take off shaft 15 of the vehicle 10. In this manner, power is transmitted from the power take off shaft 15 to the propeller 62 of the outdrive unit 58.

The outdrive unit 58 is bodily carried by a generally U-shaped support bracket 70, having spaced vertical sides 71 and a heavy bottom portion 72 formed integral therewith. Vertically spaced lugs 73 on the forward side of body portion 59 straddle the bracket portion 72 and are pivoted thereto for horizontal swinging movement by a bolt 74 or the like. Thus, the outdrive unit 58 is adapted to swing horizontally upon the axis of the bolt 74 to facilitate steering the amphibian. A laterally projecting steering arm 75 rigid with the unit 58, FIGURE 1, is connected at 76 with a push-pull steering cable 77, leading forwardly to a point near the driver's seat of the vehicle 10.

Upper extensible links 78 having shear pins 79 have their upper ends pivoted at 80 to the casing of the hydraulic lift 17. The lower ends of the links 78 are pivoted at 81 to extensions 82 of mounting bracket 70. Lower links 83 have their forward ends pivoted at 84 to the drawbar 85 of the vehicle 10. The other ends of the links 83 are pivoted as at 86 to the bracket 70, near its upper end. The upper and lower links 78 and 83 thus cross one another and are connected respectively to the lower and upper ends of the outdrive mounting bracket 70 and are also connected respectively to upper and lower points upon the rear of the vehicle 10, as at 80 and 84, previously described.

Connecting links 87 have their opposite ends pivotally connected at 88 and 89 to the hydraulic lift crank arms 18 and the lower links 83 intermediate the ends of the latter, as shown. Stabilizing links 90 may also be provided outwardly of the links 83 and pivoted to the drawbar 85 as at 91, FIGURE 1.

By virtue of the arrangement of the upper and lower links 78 and 83 and associated elements, the outdrive unit 58 is rigidly supported in any adjusted position while the hydraulic crank lift arms 18 are stationary. When these arms 18 are caused to swing vertically by the conventional hydraulic controls of the vehicle 10, near the driver's compartment, the outdrive unit 58 may be caused to swing vertically from its fully lowered or active position shown in FIGURE 2 to the horizontal stored or fully inactive position of FIGURE 8. When the outdrive unit is thus elevated by the hydraulic lift crank arms 18 and associated linkage, it is to be observed that the propeller 62 moves upwardly and away from the rear of the amphibian vehicle. The outdrive unit 58 may be locked in any desired intermediate position between the positions shown in FIGURES 2 and 8, and steering through the medium of the cable 77 and arm 75 may be accomplished in all adjusted positions of the outdrive unit. Thus, the degree of thrust afforded by the propeller 62 may be varied through rather wide limits and the propeller may be utilized to supply thrust while in an inclined or partly elevated position, as when the amphibian is entering the water and it would be impossible to propel the same by having the propeller and outdrive unit fully lowered. If an underwater obstruction is encountered by the body portion 59 or rudder 60, the shear pins 79 will fail and allow the outdrive unit to kick upwardly and clear the obstruction without damage to the unit or propeller.

While there has been illustrated in the drawings and described a preferred type of lift and hitch mechanism for the outdrive unit 58, it should be understood that the invention is not limited to a particular form of lift or hitch, and modifications of these elements may be made as found desirable within the scope of the present invention.

In conjunction with the operation and the raising and lowering of the outdrive unit 58, as above described, it should now be clear that the operator of the amphibian vehicle in the driver's seat may readily control the elevation and the longitudinal disposition of the pontoons 38 relative to the land vehicle 10 upon which they are mounted. When the cylinders 31 are activated for turning the main cranks 20 and 21 upon their pivots 22, the main shafts 26 and 27 are swung through corresponding arcs vertically and the end crank arms 35 are likewise shifted. The pontoon mounting shafts 36 pivotally connected to the end crank arms 35 position the pontoons 38 relative to the vehicle 10, so that the entire vehicle 10 including its wheels may be clear of the water or substantially so as shown in FIGURE 2. If desired, by operating the cylinders 31 and associated parts, the pontoons 38 may be elevated somewhat relative to the vehicle 10 and also shifted longitudinally relative to the vehicle to adjust the center of gravity of the amphibian in accordance with varying loading on the vehicle. It should now be clear that the mechanism for raising and lowering and longitudinally shifting the pontoons 38 relative to the vehicle 10 is quite flexible and adapted to take care of varying conditions which may be encountered. An important feature of the invention is the ability of the pontoons and their controlling linkage to hold the vehicle 10 clear of the water so as to provide planing surfaces for relatively high speed operation in the water, and without any parts of the vehicle dragging in the water and tending to retard the speed of the amphibian.

The pontoons 38 and their supporting shafts 36 are bodily detachable from the end crank arms 35 so that the vehicle 10 may travel overland. Novel means are provided to store and carry the pontoons overhead upon the vehicle 10 as indicated in FIGURES 7 and 8, and such means cooperates with the pontoon raising and lowering means already described to facilitate moving the detached pontoons from their overhead to their lowered positions and vice-versa.

The means referred to comprises pairs of elongated pontoon support arms 92 having lower angular portions 93, detachably engageable within sockets 94, rigidly secured by brackets 95 to the end crank arms 35. With reference to FIGURE 8, when the piston rods 33 of cylinders 31 are retracted, the end crank arms 35 are swung to positions where the sockets 94 are upwardly open, in contrast to their positions facing downwardly when the crank arms 35 are disposed as in FIGURE 2. U-shaped cradles 96 rigid with the end crank arms 35 and aligned with the sockets 94 also receive the angular portions 93 of the pontoon carrying arms 92. When the arms 92 are disposed as in FIGURE 8 and at the right hand side of FIGURE 7 for carrying the pontoons in the overhead position above the vehicle 10, locking pins 97 are removably engaged through registering openings in the cradles 96 and the angular portions 93.

T-fittings 98 are detachably rotatably mounted upon top reduced extensions 99 of the arms 92 and also receive therein the ends of shafts 36, as indicated at 100. By virtue of this arrangement, the pontoons 38 are carried upside down and directly above the top of the vehicle 10, during travel of the same over land.

When it is desired to lower the pontoons 38 prior to re-attaching them directly to the crank arms 35, the following procedure is followed. The pins 97 are withdrawn from the cradles 96 and angular portions 93. This frees the angular extensions 93 to rotate within the sockets 94 and cradles 96, and the angular portions 93 will serve as hinges so that the arms 92 may readily be swung outwardly from the vehicle 10 to the inclined positions shown in FIGURE 7. The angular portions 93 of the pontoon carrying arms 92 have radial stop lugs 101 rigid therewith, and swingable into positive engagement with the crank arms 35 to halt the rotation of the arms 92 within the sockets 94, when the arms reach the position shown at the left hand side of FIGURE 7. The extensions 99 rotate within the T-fittings 98 to permit this relative movement of the pontoons and the crank arms 35.

In order to now lower the arms 92 and the pontoons 38 toward the ground, it is merely necessary to pressurize the cylinders 31 for thereby swinging the crank arms 35 and associated elements back toward their positions illustrated in FIGURE 2. As this occurs, the pontoons 38 are gradually lowered upon their sides toward the ground, and the arms 92 and the pontoons travel from the position shown at the left hand side of FIGURE 7 toward the fully lowered position illustrated in FIGURE 9, wherein the pontoons are horizontal and on their sides and the arms 92 are also horizontal.

In this position, the arms 92 are readily detachable from the sockets 94 and cradles 96 and the T-fittings 98 are readily removable from the pontoon support shafts 36. The arms 92 and T-fittings 98 are now removed bodily from the pontoons and crank arms 35, and the pontoons are set upright and re-attached to the end crank arms 35 in the manner shown in FIGURE 5 and previously described. The pontoons are then operable relative to the vehicle 10 in the manner previously described in connection with FIGURE 2 and other figures of the drawings. As should be obvious, the operation for raising the pontoons 38 from their sidewise horizontal positions shown in FIGURE 9 to their positions of FIGURE 7 is the reverse of the operation just described for lowering the pontoons and arms 92. The relative rotation between the T-fittings 98 and the arms 92 makes it possible for the crank arms 35 ot lower the pontoons from their overhead positions to their positions shown in FIGURE 9 without binding of the mechanism.

It should now be apparent that the above-described means including the arms 92 and associated elements provides a simplified and expeditious manner for moving the relatively bulky pontoons from their lower disconnected positions to their overhead stored or transporting positions, substantially without physical effort on the part of the operator. The pontoons are lowered and elevated in a simple two-stage operation utilizing the inclined arm portions 93 as hinges, in the manner previously described. The final lowering of the pontoons and arms 92 is effected by the operation of the hydraulic cylinders 31 and the crank arms 35 actuated thereby.

In view of the foregoing description, it is believed that the overall operation of the amphibian vehicle should now be obvious to anyone skilled in the art, and a further description of the operation of the vehicle is believed to be unnecessary herein.

After separation from the crank arms 35 and pontoons, the carrying arms 92 may be stored in the vehicle 10 or strapped to the sides thereof by any suitable means, not shown.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described the invention, what I claim is:

1. An amphibian vehicle comprising a wheeled vehicle having a rotary power take off shaft and lift means near the rear end thereof, an outdrive unit including a propeller and gearing, linkage means interconnecting said outdrive unit and lift means, whereby the outdrive unit may be raised and lowered at the will of an operator of the amphibian vehicle, a pair of pontoons disposed on opposite sides of said wheeled vehicle, linkage means including pairs of vertically swingable cranks and pontoon support shafts carried by said cranks and adapted to be raised and lowered and shifted fore and aft with said cranks, fluid pressure operated means for actuating the last-named linkage means, and resilient suspension means for said pontoons directly connected therewith and with said pontoon supporting shafts.

2. An amphibian vehicle comprising a wheeled vehicle having a main frame, bracket means secured to the main frame, fluid pressure operated linkage means carried by the bracket means and including vertically and longitudinally shiftable crank arms, pairs of transverse horizontal shafts carried by said crank arms and projecting outwardly thereof on opposite sides of the wheeled vehicle, pontoons underlying said shafts, pairs of resilient suspension units mounted within said pontoons near said shafts, pairs of elements rigidly interconnecting said shafts and resilient suspension units, whereby shocks imparted to said pontoons are absorbed by said suspension units and are not transmitted directly to said shafts, an outdrive unit disposed rearwardly of said wheeled vehicle and pontoons, and means to raise and lower the outdrive unit and to turn the same for steering the amphibian vehicle.

3. An amphibian vehicle comprising in combination, a wheeled vehicle, a pair of pontoons adapted to support the wheeled vehicle upon water, power-operated linkage means carried by the wheeled vehicle and detachably connected with said pontoons and operable to shift the pontoons vertically and fore and aft relative to the wheeled vehicle, an outdrive unit trailing said wheeled vehicle and pontoons, linkage means interconnecting the outdrive unit and wheeled vehicle and permitting the outdrive unit to be raised and lowered and turned upon a vertical axis for steering the amphibian vehicle, and means detachably engaging said pontoons and detachably engaging said power-operated linkage means and operated in part by the latter for supporting said pontoons above the wheeled vehicle when the latter is traveling over land.

4. The invention according to claim 3, and wherein said last-named means includes pairs of elongated arms having angular portions at their lower ends, socket means carried by power-operated linkage means and receiving said angular portions rotatably, stop means upon said angular portions engageable with the power-operated linkage means to limit rotation of said arms relative thereto, and fitting means interconnecting said arms and pontoons rotatably when the pontoons are in overhead positions relative to the wheeled vehicle.

5. In an amphibian vehicle, a wheeled vehicle having a power take off shaft and an implement lift, an outdrive unit including a propeller, a rudder portion and gearing, an upstanding mounting bracket carrying the outdrive unit and pivoted thereto upon a substantially vertical axis, an extensible drive shaft interconnecting said gearing and power take off shaft, an upper pair of links interconnecting said wheeled vehicle and mounting bracket near the bottom of the latter, a lower pair of links interconnecting said vehicle below said upper links and said mounting bracket near the top of the latter, vertically swingable crank arms for said lift, connecting links between said crank arms and said lower pair of links, whereby said outdrive unit may be raised and lowered and rigidly locked in any selected adjusted position between the vertical and horizontal, a steering arm secured to said outdrive unit and projecting beyond one side thereof, cable means secured to said steering arm and extending near the operator's compartment of said wheeled vehicle and operable to swing said outdrive unit upon said vertical pivot to steer said amphibian vehicle, pontoon means to support said wheeled vehicle upon the water, and power-operated linkage means interconnecting said pontoon means and wheeled vehicle and operable to shift the pontoon means vertically and longitudinally relative to said wheeled vehicle.

6. An amphibian vehicle comprising a wheeled vehicle having a main frame, outrigger brackets secured to the main frame of the wheeled vehicle at opposite sides of the main frame, main crank arms pivoted to pairs of said outrigger brackets and being vertically swingable, fluid pressure operated piston means pivotally secured to additional ones of said outrigger brackets and pivotally connected with said main crank arms at points spaced from the pivots thereof, links pivotally interconnecting said main crank arms so that the latter will turn in unison, main horizontal transverse shafts secured to and carried by the main crank arms and underlying said vehicle main frame transversely and extending outwardly upon opposite sides of the main frame, end crank arms rigidly secured to the ends of said main shafts for movement therewith, horizontal transverse pontoon support shafts rotatably secured to said end crank arms and projecting outwardly thereof on opposite sides of said vehicle, pontoons underlying said pontoon support shafts, resilient suspension means in said pontoons, rigid arms interconnecting said suspension means and said pontoon support shafts, whereby shocks imparted to said pontoons in the water are absorbed substantially by said suspension means, said pontoons being vertically shiftable and shiftable fore and aft by operation of said fluid pressure operated piston means, an outdrive unit including a propeller and rudder for the rear of the amphibian vehicle, and means carried by said wheeled vehicle and connected with the outdrive unit to raise and lower the same and to turn the outdrive unit upon a substantially vertical axis for steering the amphibian vehicle.

7. The invention according to claim 6, and wherein said pontoons and pontoon supporting shafts are detachable from said end crank arms, and separate pontoon carrying arms detachably engageable with said pontoon supporting shafts and swiveled thereto and also having swiveled socketed engagement with said end crank arms when the latter are adjusted to generally upright positions.

8. The invention according to claim 7, and wherein said separate pontoon carrying arms have angular portions adapted to serve as hinges relative to the end crank arms, locking pins engageable through said angular portions to hold the same against rotation relative to the end crank arms and being removable, and stops carried by said angular portions and engagable with the end crank arms to limit rotation of the pontoon carrying arms relative thereto in one direction.

References Cited in the file of this patent

UNITED STATES PATENTS

| | | |
|---|---|---|
| 996,444 | Yarrington | June 27, 1911 |
| 2,400,132 | Porter | May 14, 1946 |
| 2,494,316 | Sanderson | Jan. 10, 1950 |
| 2,514,488 | Hale et al. | July 11, 1950 |
| 2,562,431 | Maile | July 31, 1951 |
| 2,919,669 | Shizuo Kikuhara | Jan. 5, 1960 |

FOREIGN PATENTS

| | | |
|---|---|---|
| 501,126 | Italy | Nov. 23, 1954 |
| 1,175,607 | France | Mar. 31, 1959 |